(12) United States Patent
Esswein et al.

(10) Patent No.: US 11,639,017 B2
(45) Date of Patent: May 2, 2023

(54) LAMELLA BLOCK WITH CONTINUOUSLY VARIED LAMELLA DIVISION

(71) Applicant: KRAUSSMAFFEI TECHNOLOGIES GMBH, Munich (DE)

(72) Inventors: Michael Esswein, Fahrenzhausen (DE); Walter Breuning, Bergkirchen Bayern (DE); Stefan Buhl, Dachau (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/434,844

(22) PCT Filed: Feb. 13, 2020

(86) PCT No.: PCT/EP2020/053692
§ 371 (c)(1),
(2) Date: Aug. 30, 2021

(87) PCT Pub. No.: WO2020/187494
PCT Pub. Date: Sep. 24, 2020

(65) Prior Publication Data
US 2022/0143892 A1 May 12, 2022

(30) Foreign Application Priority Data
Mar. 21, 2019 (DE) ...................... 10 2019 002 025.1

(51) Int. Cl.
*B29C 48/09* (2019.01)
*B33Y 10/00* (2015.01)
(Continued)

(52) U.S. Cl.
CPC .............. *B29C 48/09* (2019.02); *B22F 10/28* (2021.01); *B22F 10/80* (2021.01); *B29C 48/903* (2019.02);
(Continued)

(58) Field of Classification Search
CPC ... B29C 48/907; B29C 48/904; B29C 48/903; B29C 48/908; B29C 48/09; B29C 48/12; B33Y 10/00; B33Y 50/00; B33Y 80/00
See application file for complete search history.

(56) References Cited

U.S. PATENT DOCUMENTS

2003/0211657 A1  11/2003 Williams et al.
2006/0034965 A1   2/2006 Ulrich et al.
(Continued)

FOREIGN PATENT DOCUMENTS

DE       19843340 C2   11/2001
DE       10315125 B3    9/2004
(Continued)

OTHER PUBLICATIONS

International Preliminary Report on Patentabilty for PCT/EP2020/053692 dated Jun. 9, 2021.
(Continued)

*Primary Examiner* — Monica A Huson
*Assistant Examiner* — Kelsey C Grace
(74) *Attorney, Agent, or Firm* — Pearne & Gordon LLP

(57) ABSTRACT

A lamella block is provided for a calibrating device for calibrating an extruded profile, wherein the lamella block includes a lamella structure, which has a plurality of lamellae that are spaced apart from each other by grooves and arranged in the longitudinal direction of the lamella block. The lamella structure has a variably designed division in the longitudinal direction of the lamella block. Further provided is a method for manufacturing the aforementioned lamella block, as well as a calibrating device, which includes a plurality of the lamella blocks mentioned above. Also provided is a system for additively fabricating the lamella blocks mentioned above, a corresponding computer program and a corresponding dataset.

9 Claims, 6 Drawing Sheets

(51) Int. Cl.
  *B33Y 50/00* (2015.01)
  *B33Y 80/00* (2015.01)
  *B29C 48/90* (2019.01)
  *B22F 10/28* (2021.01)
  *B22F 10/80* (2021.01)
  *B29C 48/12* (2019.01)

(52) U.S. Cl.
  CPC .......... *B29C 48/904* (2019.02); *B29C 48/907* (2019.02); *B29C 48/908* (2019.02); *B33Y 10/00* (2014.12); *B33Y 50/00* (2014.12); *B33Y 80/00* (2014.12); *B29C 48/12* (2019.02)

(56) References Cited

U.S. PATENT DOCUMENTS

| | | | |
|---|---|---|---|
| 2006/0071372 A1* | 4/2006 | Stieglitz | B29C 48/903 425/71 |
| 2006/0159796 A1 | 7/2006 | Schmuhl et al. | |
| 2006/0240134 A1* | 10/2006 | Stieglitz | B29C 48/09 425/325 |
| 2007/0184981 A1 | 8/2007 | Nun et al. | |
| 2018/0058473 A1* | 3/2018 | Kenworthy | F28F 3/04 |
| 2018/0170115 A1* | 6/2018 | Korkama | B29D 30/0606 |

FOREIGN PATENT DOCUMENTS

| | | |
|---|---|---|
| DE | 10315128 B3 | 9/2004 |
| DE | 102005002820 B3 | 5/2006 |
| DE | 102009016100 A1 | 10/2010 |
| WO | 2004103684 A1 | 12/2004 |

OTHER PUBLICATIONS

"The POWDERS that make the PRODUCTS from the global leader in P/M and MIM powders" IN: Medal Additive Manufacturing Powder Metallurgy Review, 2014, pp. 1-6.

International Search Report for PCT/EP2020/053692 dated May 26, 2020 and translation thereof.

* cited by examiner

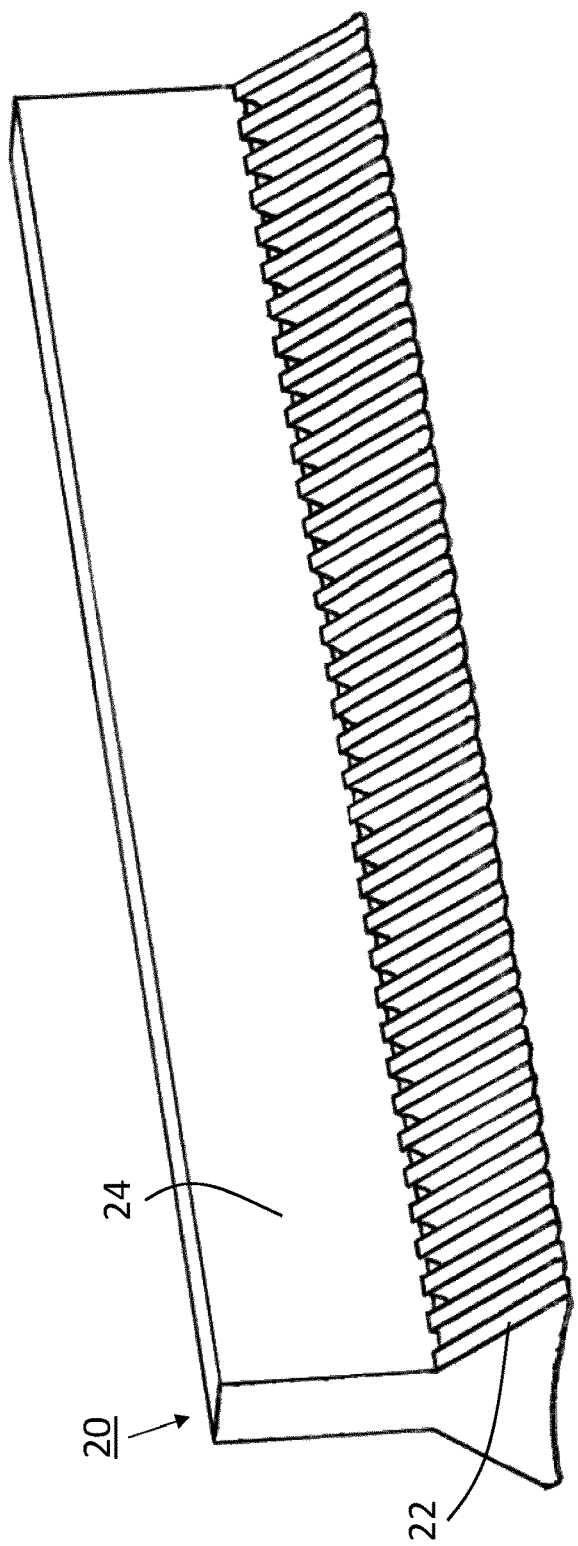
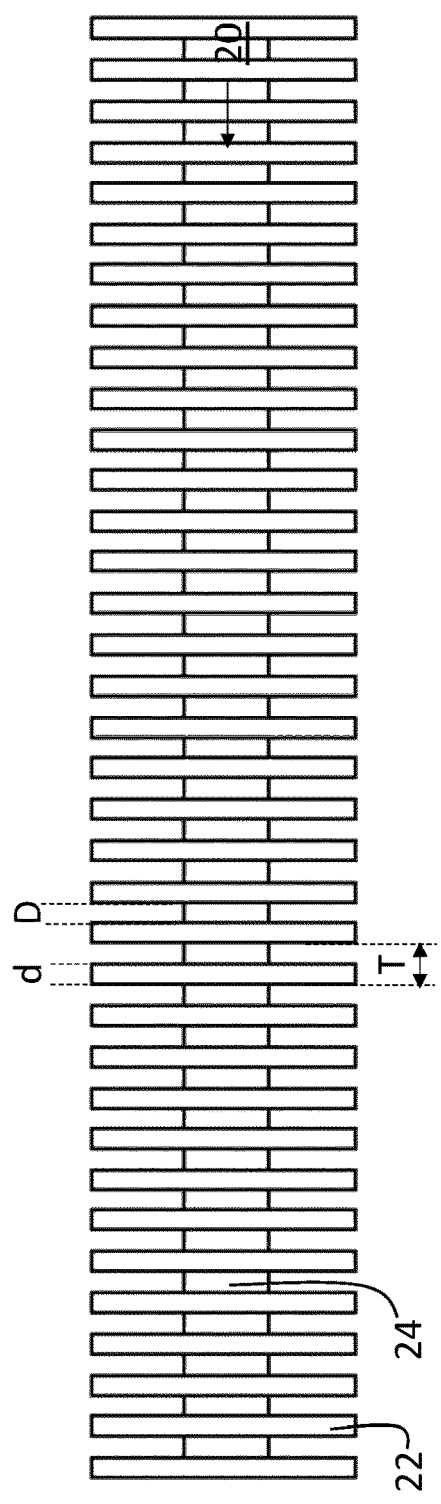
Fig. 2a
Fig. 2b

LAMELLA BLOCK WITH CONTINUOUSLY VARIED LAMELLA DIVISION

CROSS-REFERENCE TO RELATED APPLICATIONS

This is a National Stage application of PCT international application PCT/EP2020/053692 filed on Feb. 13, 2020, which claims the priority of German Patent Application No. 10 2019 002 025.1, filed Mar. 21, 2019, which are incorporated herein by reference in their entireties.

FIELD OF THE INVENTION

The invention relates to a lamella block for a calibrating device for calibrating an extruded profile. The invention further relates to a method for manufacturing such a lamella block, a system for additively fabricating such a lamella block, and a corresponding computer program and dataset.

BACKGROUND OF THE INVENTION

Calibrating devices are used for calibrating extruded endless profiles, for example such as pipe profiles. During the manufacture of such profiles, a polymer melt desired for manufacturing the profile is first generated in an extruder. The generated polymer melt is then pressed through an outlet nozzle of the extruder, which prescribes the shape of the profile. The profile exiting the outlet nozzle of the extruder then runs through a calibrating device, which copies the still heated profile in a dimensionally accurate manner.

Such a calibrating device for dimensioning extruded profiles is known from DE 198 43 340 C2. Taught therein is a variably adjustable calibrating device, which is designed to calibrate extruded plastic pipes with a varying pipe diameter. The calibrating device comprises a housing and a plurality of lamella blocks circularly arranged in the housing, which together form a calibrating basket with a circular calibrating opening, through which the pipes to be calibrated are guided (see in particular FIGS. 1 and 2 of DE 198 43 340 C2). Each lamella block is further coupled with an actuating device, which is provided for individually radially displacing the respective lamella block. In this way, the active cross section of the circular calibrating opening formed by the plurality of lamella blocks can be correspondingly adjusted as needed.

The lamella blocks described in DE 198 43 340 C2 each consist of a plurality of lamellae, which are threaded onto two spaced apart carrier rods. Spacer sleeves are used to maintain a desired distance between adjacent lamellae (see also FIG. 3 of DE 198 43 340 C2). An example for a threaded lamella block is further shown on FIG. 1. The lamella block 10 shown on FIG. 1 comprises a plurality of lamellae 12 and spacer sleeves 14, which are alternatingly threaded along two carrier rods 16. Such threaded lamella blocks are complicated to manufacture, and thus cost intensive.

Also known apart from the threaded lamella blocks described above are lamella blocks with closed carrier structures (or back structures). FIGS. 2a and 2b show an example of such a lamella block. The lamella block 20 comprises a plurality of lamellae 22, which are carried by a back structure 24 with a block-shaped design (see 3D view on FIG. 2a). The block-shaped back structure 24 is here realized in the form of a massive body (e.g., a rod-shaped body). Additional examples of lamella blocks with a closed back structure are known from WO 2004/103684 A1. Such lamella blocks can be integral in design. They can also be cost effectively manufactured out of a material block via suitable machining operations (such as milling, cutting to size). However, it is also conceivable to use a casting process to manufacture the lamella block 20.

The lamella blocks 10, 20 shown on FIGS. 1, 2a and 2b share in common that the lamellae 12, 22 as well as the distance ranges between the lamellae 12, 22 (also referred to as grooves) each have a prescribed, constant width. As a consequence, the lamella structures of the lamella blocks 10, 20 generated by the lamellae 12, 22 and grooves each have a constant division T (periodicity) in the longitudinal direction of the lamella blocks 10, 20 (see FIGS. 1 and 2b). Division T here refers to the smallest length within the lamella structure after which the arrangement of lamellae repeats. Division T depends on the width d of the lamellae and the width D of the grooves within the lamella structure, and corresponds to the sum of the widths of a lamella and its adjacent groove (i.e., $T=d+D$).

Frequently observed in the lamella blocks with a constant division described here is a rattling of the profiles to be calibrated while the latter are being pushed through the calibrating basket. The rattling is caused by the bulging structure that arises on the profile surface while calibrating the profile. This is because the plastic of the profile to be calibrated is still plastically deformable in the calibrating process, and is slightly pressed into the grooves of the lamella structure. This causes bulging fields (bulges for short) to form on the surface of the profile to be calibrated, whose dimensions correspond to the dimensions of the grooves. In this way, a bulging structure that repeats with the division T of the lamella structure arises on the surface of the profile to be calibrated. As the profile to be calibrated is advanced through the calibrating basket of the calibrating device, already generated bulges on the profile surface "latch" into subsequent grooves of the lamella blocks. The repeated latching of bulges into the grooves leads to the undesired rattling of the profile to be calibrated in the calibrating basket. On the other hand, the bulging structure on the profile surface is strengthened by the repeated embossing of the lamella structure on the profile surface.

BRIEF SUMMARY OF THE INVENTION

DE 10 2009 016 100 A1 relates to a calibrating device for a system for extruding plastic pipes, comprising calibrating tools that abut against the outer wall of the pipe during calibration, wherein a plurality of segment-like calibrating tools are distributed over the periphery of the pipe to be calibrated, each with their midpoints spaced apart from each other, and each form an annular arrangement, and wherein a plurality of such annular arrangements are provided as viewed in the production direction of the pipe, wherein the individual tools of two annular arrangements that follow each other in the longitudinal direction are each offset relative to each other in the peripheral direction, and the segment-like tools of the ring that immediately follows in the longitudinal direction each engage into the gap between the tools of a ring and the ring after next, thereby yielding a toothed arrangement. The invention provides that the individual segment-like calibrating tools extending in the peripheral direction be designed as hollow bodies, and have slits in the area of their sliding surfaces that abut against the pipe periphery, which are connected with a hollow space in the hollow body. As a result, water or low pressure can be applied to the pipe surface via the slits.

DE 10 2005 002 820 B3 relates to an infinitely variable calibrating sleeve for extruded plastic pipes with an inlet head and two tape layers, which cross each other like a kind of scissor grid, and are hinged together at the crossing points. The inlet head and tape layers are here adjustable to the pipe diameter, and the inlet head has radially adjustable and overlapping segments, which are arranged in a radial plane, distributed on the periphery of the plastic pipe to be calibrated, have slits in their overlapping areas and engage into each other like teeth. The end faces of the segments are designed to abut against the plastic pipe to be calibrated, and the tape layers are hinged to the segments flush with the end faces. This type of calibrating sleeve is intended to achieve an effective seal for the vacuum tank relative to the environment, as well as prevent compressions of the incoming, extruded plastic pipe.

DE 103 15 125 B3 relates to a calibrating device for calibrating extruded endless profiles, in particular pipes, comprising a plurality of segment wreaths arranged one after the other and comprised of individual segments, the inner surface of which together forms a calibrating opening, wherein segments lying one after the other in an axial direction are combined into a segment block, the individual segments of each segment block are arranged on a carrier structure, the segment blocks are essentially circularly received in a housing in such a way that axially adjacent segments partially overlap in each position in the peripheral direction, and each carrier structure is connected with at least one mounting and fastening device, with which the individual segment blocks allocated to a respective carrier structure are held in the housing, and each individual segment block can be adjusted in the radial direction. To facilitate installation and facilitate assembly, it is here proposed that each mounting and fastening device consist of two parts, wherein a first part is connected with the carrier structure, a second part is accommodated in the housing, and both parts are detachably connected with each other.

US 2003/211 657 A1 describes a heatsink manufactured via stereolithography. The heatsink has a heat transfer element, which is configured in such a way as to be arranged in proximity to a semiconductor array, so as to absorb heat from the semiconductor array while in use. The heatsink also has a heat dissipating element, which is configured to emit heat when air passes by a surface thereof. When using stereolithographic methods for manufacturing the heat dissipating element of the heatsink, the heat dissipating element can have nonlinear or winding passages through which air can flow. Since at least one part of the heatsink is fabricated via stereolithography, this part can have a series of superimposed, contiguous, mutually adherent layers comprised of thermally conductive material. The layers can be manufactured via consolidated, selected areas of a layer out of nonconsolidated, particulate or powdery material, or by defining an object layer out of a material layer. The stereolithographic method can involve the use of an image processing system that comprises at least one camera operationally connected with a computer, which controls a stereolithographic material application, so that the system can recognize the position and alignment of a semiconductor device or another substrate on which the heatsink is located be manufactured [sic].

The object of the present invention is to provide lamella blocks for a calibrating device which further reduce or eliminate the problems indicated in conjunction with prior art. In particular, the object of the present invention is to improve the surface structure of the profile to be calibrated. In addition, the object is to at least reduce or entirely avoid the rattling of the profile to be calibrated that is observed in conjunction with known calibrating blocks.

In a first aspect, the aforementioned object is achieved by providing a lamella block for a calibrating device for calibrating an extruded profile. The lamella block comprises a lamella structure, which has a plurality of lamellae that are spaced apart from each other by grooves and arranged in the longitudinal direction of the lamella block. The lamella structure further has a variably designed division in the longitudinal direction of the lamella block.

The extruded profile can be a plastic profile. The extruded plastic profile can be an endless profile, for example a pipe profile.

The division of the lamella structure in the longitudinal direction of the lamella block (i.e., along the lamella block) depends on the width of the lamellae and the width of the grooves. The division (division length) of the lamella structure is comprised of the width of a lamella and the width of its adjoining groove. If the width of the lamellae and/or the width of the grooves varies in the longitudinal direction of the lamella structure (or lamella block), the division in the longitudinal direction of the lamella structure also varies accordingly. The groove refers to the distance between two neighboring lamellae within the lamella structure, as described at the outset.

The division of the lamella structure can continuously vary (change) in the longitudinal direction of the lamella block. Continuously vary can mean that the lamella structure has sequential divisions each with varying division lengths. The lamella structure thus has no areas with a constant division. Rather, the division within the lamella structure can vary from lamella to lamella.

In one variant, the division can change as desired along the lamella structure. This means that the change (variation) in division along the lamella structure follows no prescribed pattern (functional correlation). Rather, the variation of the division along the lamella structure is random. Accordingly, the varying division lengths of sequential divisions also follow no pattern describable by a function, but are instead randomly selected.

The division along the lamella structure varies according to a prescribed function. The function describing the division change can be a constant function. For example, the function describing the division change can conceivably be one where the division along the lamella structure continuously increases or continuously decreases from one lamella structure end to the opposing lamella structure end. Also conceivable, however, is a division change according to a function in which the division initially increases/decreases continuously proceeding from one lamella structure end, and subsequently continuously decreases/increases again until it reaches the opposing lamella structure end. Regardless of the specific implementation, the function describing the division change should be selected in such a way as to have no periodicity along the lamella structure. This prevents the formation of a periodic superstructure in the lamella structure.

The variable division of the lamella structure described above can be realized in varying ways. In one variant, the lamella structure can have grooves with a variable groove width in the longitudinal direction of the lamella block. Grooves with varying groove widths make it possible to realize a variable division of the lamella structure. In another variant, the lamella structure can have lamellae with a variable lamella width in the longitudinal direction of the lamella block. Lamellae with varying lamella widths also make it possible to realize a variable division of the lamella structure. In another implementation, the width of the lamellae and the width of the grooves can vary in the longitudinal direction. The width of the lamellae and width of the grooves refers to the dimensions of the lamellae and grooves in the longitudinal direction of the lamella block.

The lamella block can further have a carrier structure, on which the lamella structure is arranged. The carrier structure can comprise a block-shaped back structure with a beam-shaped design. The block-shaped back structure can further be provided with holes, so as to reduce the weight of the lamella block.

The carrier structure can be integrally designed with the lamellae or the lamella structure. In order to achieve an integral configuration, the lamella block can be manufactured by means of 3D printing. However, it is also conceivable that the lamella block be fabricated via milling, drilling and/or cutting out of a single workpiece. As an alternative, the lamella structure or the lamellae along with the carrier structure can each be separately fabricated. The lamella structure (or the lamellae) can then be correspondingly connected with the carrier structure.

The carrier structure and the lamellae can be fabricated out of the same material or out of different materials. In one variant, the material used to fabricate the carrier structure and/or the lamellae can be made out of a metal material. However, the use of a polymer material (with additives) is also conceivable.

Another aspect of the invention provides a calibrating device for calibrating extruded plastic profiles, wherein the calibrating device has a plurality of the lamella blocks according to the invention, which are arranged relative to each other so as to form a calibrating opening. The lamella blocks can here be arranged in such a way as to form a circular calibrating opening.

The calibrating device can further comprise a plurality of activating devices, wherein each activating device is coupled with a respective lamella block. The activating device can be used to individually activate the lamella block radially to the calibrating opening. As a result, the active cross section of the calibrating opening can be adjusted to the cross section (diameter) of the profile to be calibrated as needed.

The calibrating device can further have a housing that is provided to accommodate and store the activating devices and the lamella blocks coupled with the activating devices.

Another aspect of the invention provides a method for manufacturing a lamella block as described above. The method for manufacturing a lamella block involves at least the step of manufacturing the lamella block by means of 3D printing or additive manufacturing processes. The manufacture of the lamella block in a 3D printing process or additive manufacturing processes can here comprise the layer by layer laser sintering/laser melting of material layers, wherein the material layers are applied one after the other (sequentially) according to the shape of the lamella block to be generated.

The method can further involve the step of calculating a lamella block geometry (CAD data), and optionally of converting the 3D geometric data into corresponding control commands for 3D printing or additive manufacture.

Another aspect provides a method for manufacturing a lamella block, which involves the following steps: Generating a dataset, which images the lamella block as described above, and storing the dataset on a storage device or a server. The method can further involve: Inputting the dataset into a processing device or a computer, which actuates an additive manufacturing device so that the latter fabricates the lamella block imaged in the dataset.

Another aspect provides a system for additively manufacturing a lamella block, with a dataset generating device for generating a dataset that images the lamella block described as above, a storage device for storing the dataset and a processing device for receiving the dataset and for actuating an additive manufacturing device in such a way that the latter fabricates the lamella block imaged in the dataset. The storage device can be a USB stick, a CD ROM, a DVD, a memory card or a hard disk. The processing device can be a computer, a server or a processor.

Another aspect provides a computer program or computer program product, comprising datasets, which while the datasets are being read in by a processing device or a computer, prompts the latter to actuate an additive manufacturing device in such a way that the additive manufacturing device fabricates the lamella block as described above.

Another aspect provides a computer-readable data carrier, which stores the computer program described above. The computer-readable data carrier can be a USB stick, a CD-ROM, a DVD, a memory card or a hard disk.

Another aspect provides a dataset, which images the lamella block as described above. The dataset can be stored on a computer-readable data carrier.

BRIEF DESCRIPTION OF THE DRAWINGS

Additional advantages, details and aspects of the present invention are discussed based on the drawings below. Shown on:

FIG. 2a/2b are views of another lamella block for a calibrating device according to prior art;

DESCRIPTION OF EXAMPLE EMBODIMENTS

Figure 1:
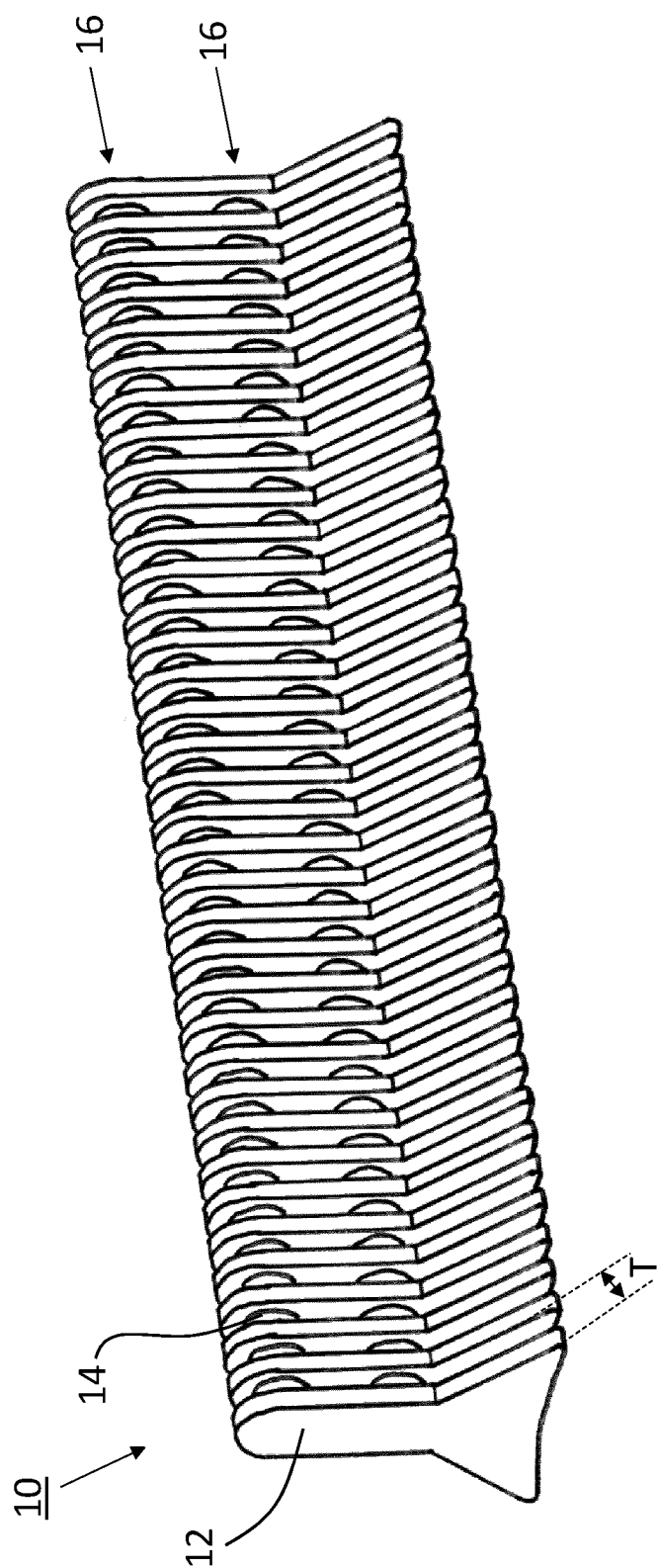
FIG. 1 is a 3D view of a lamella block for a calibrating device according to prior art.

FIGS. 1, 2a and 2b were already discussed at the outset in conjunction with prior art. Let reference be made to the description there.

Figure 3:
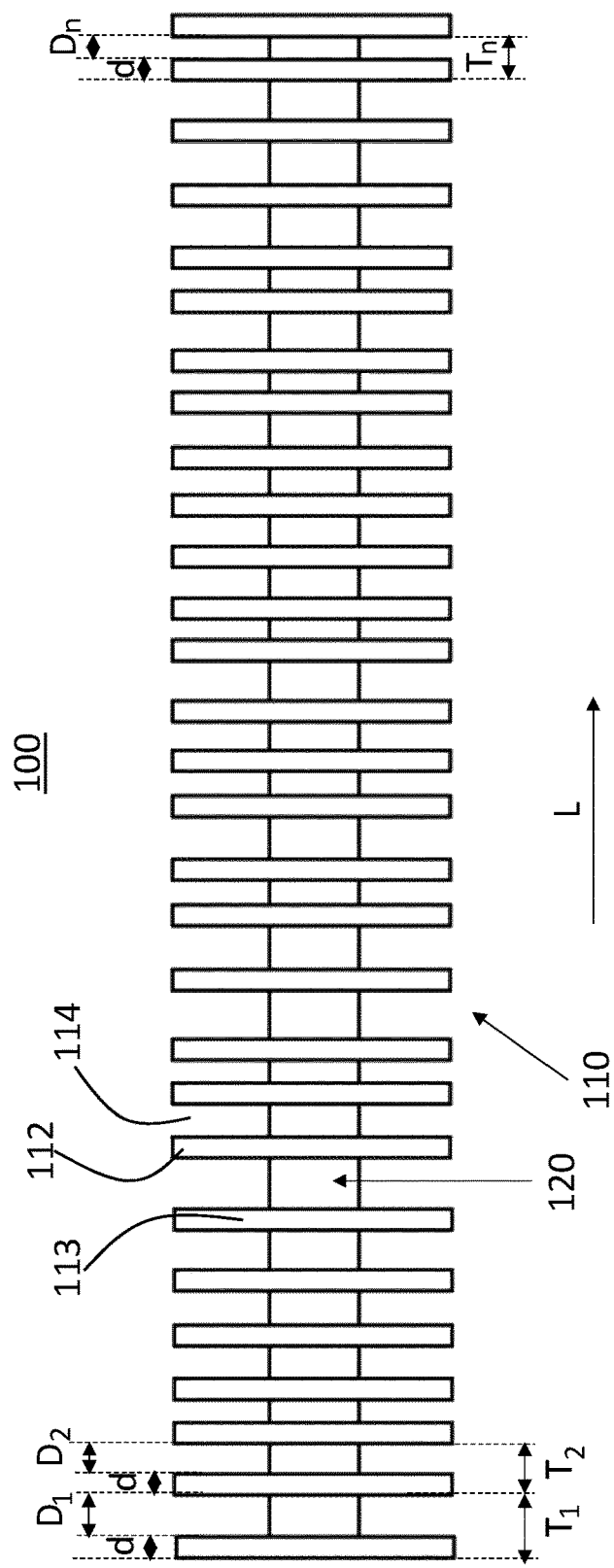
FIG. 3 is a view of a lamella block according to the present invention.

In conjunction with FIG. 3, a lamella block 100 according to the invention will now be described further. FIG. 3 shows a view of an interior side of the lamella block 100. Interior side denotes that side of the lamella block 100 that faces a profile to be calibrated.

The lamella bock 100 comprises a lamella structure 110, which comprises a plurality of lamellae 112 and grooves 114, which separate neighboring lamellae 112 from each other. As a consequence, the free spaces (distances) between sequential lamellae 112 are labeled as grooves 114. In the view shown on FIG. 3, each individual lamella 112 of the lamella structure 110 is shown in the form of a transverse beam. The lamella block 100 further comprises a carrier structure 120 for receiving (storing) the lamellae 112 (or lamella structure 110). The carrier structure 120 along which the lamellae 112 are arranged is denoted as a longitudinal beam (horizontal beam) on FIG. 3.

The carrier structure 120 can have a back structure with a block-shaped design. The back structure can be realized by a beam-shaped body, along which the lamellae 112 are arranged. In particular, the beam-shaped back structure can have holes for reducing the weight. As a consequence, the carrier structure 120 can be designed exactly like the carrier structure of the lamella block 20 described in conjunction with FIGS. 2a and 2b. Let reference be made to the corresponding description for FIGS. 2a and 2b. Alternatively, the carrier structure 120 can have at least one carrier rod, on which the lamellae 112 are threaded, just as described at the outset in conjunction with the lamella block on FIG. 1. The distance (grooves) between sequential lamellae 112 is realized in the threaded lamella block by means of spacer sleeves of a suitable length.

The lamellae 112 of the lamella structure 110 each have a prescribed cross sectional profile perpendicular to the longitudinal direction L of the lamella block 100. The cross sectional profile of each lamella 112 can here correspond to the cross sectional profile of the lamellae shown on FIG. 1 or 2a. Each lamella 112 further has a lamella surface 113 that faces the profile to be calibrated. The lamella surfaces 113 of the lamellae 112 form a contact surface, with which the profile to be calibrated comes into contact. The lamella surface 113 facing the profile to be calibrated can also be flat in design, or have a curved surface.

As further evident from FIG. 3, all lamellae 112 of the lamella structure 110 have the same width d in the longitudinal direction L of the lamella block 100. However, the distances (i.e., the groove width areas) between sequential lamellae 112 differ in the longitudinal direction L. The lamella structure 110 on FIG. 3 has a sequence of n grooves 114 in the longitudinal direction L, wherein the width $D_1$, $D_2$, ... $D_n$ (n is a natural number) of the individual grooves 114 varies. Continuously varying the groove widths $D_1$, $D_2$, ... $D_n$ thus yields a lamella structure 110 with a variable division in the longitudinal direction L. As a consequence, the lamella structure 110 has a sequence of n sequential divisions $T_1$, $T_2$, ... $T_n$ (n is a natural number) with a variable division length in the longitudinal direction L. Division (or division length) here refers to the length of the base unit that builds up on the lamella structure 110, which consists of a lamella 112 and its adjoining groove 114. In other words, each division $T_i$ (with i=1, n, wherein n is a natural number) along the lamella structure 110 corresponds to the sum of the width d of the corresponding lamella 112 and the width D of the groove 114 that adjoins the lamella 112.

In the lamella structure 110 shown on FIG. 3, the variation (change) in groove widths $D_1$, $D_2$, ... $D_n$ (and hence the variation of divisions $T_1$, $T_2$, ... $T_n$) in the longitudinal direction L (i.e., along the lamella block 100) takes place continuously. Continuous variation means that neighboring divisions within the division sequence $T_1$, $T_2$, ... $T_n$ have varying division lengths. The lamella structure 110 thus has no lamella structure areas within which the division remains constant.

The variation of divisions $T_1$, $T_2$, ... $T_n$ along the lamella structure 110 is further selected randomly. The variation of divisions $T_1$, $T_2$, ... $T_n$ in a longitudinal direction L follows no prescribed pattern (functional correlation). In particular, the division sequence $T_1$, $T_2$, ... $T_n$ within the lamella structure 110 has no periodicity. Instead, divisions with larger and smaller division lengths alternate, wherein the division lengths are random.

Figure 4:
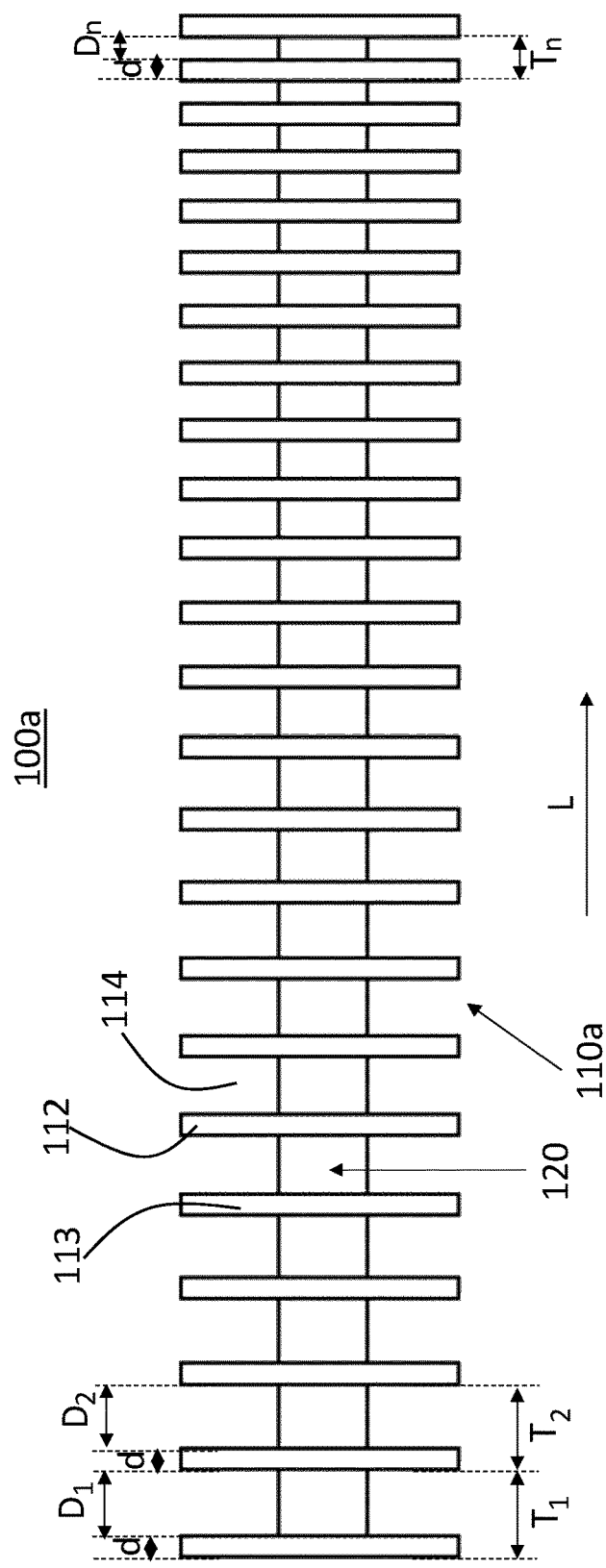
FIG. 4 is a view of another lamella block according to the present invention.

Another lamella block 100a according to the present invention is described in conjunction with FIG. 4. The lamella block 100a once again has a lamella structure 110a with a plurality of lamellae 112 arranged spaced apart from each other. The lamella block 100a further has a lamella carrier 120 that carries the lamella structure 110a. The lamella carrier 120 and lamellae 112 can be designed exactly as in the lamella block 100 on FIG. 3. In particular, the lamellae 112 of the lamella structure 110 once again have a prescribed, uniform width d. For simplification purposes, the lamella carrier 110 and the lamellae 122 are provided with the same reference numbers as in the lamella block 100 on FIG. 3. Reference is further made to the corresponding description of the lamellae 112 and the lamella carrier 110 in conjunction with the FIG. 3 further above.

The difference between the lamella block 100 on FIG. 3 and the lamella block 100a on FIG. 4 lies in the formation of the lamella structure 110a. As in the lamella structure 100 on FIG. 3, the lamellae 112 of the lamella structure 110a each have the same width d. In addition, the width $D_i$ (with i=1, n, wherein n is a natural number) of the grooves 114 in a longitudinal direction L of the lamella block 100a varies continuously. As a consequence, the divisions $T_i$ (with i=1, n, wherein n is a natural number) also vary in the longitudinal direction L. However, the continuous variation of divisions in the longitudinal direction L is not random (as in the lamella structure 110 on FIG. 3), but follows a constant function. Based on the implementation shown on FIG. 4, the division of the lamella structure 110a in the longitudinal direction L varies according to a linear function. Proceeding from a first end of the lamella structure (left end on FIG. 4), the division length of the divisions $T_1$, $T_2$, ... $T_n$ linearly decreases continuously up to a second end of the lamella structure 110a (right end on FIG. 4). It goes without saying that the linear decrease in division lengths described here is only exemplary, and that another functional variation of the divisions is just as conceivable. It is only critical that the variation of the division within the lamella structure be such that no lamella areas with a constant division arise.

Continuously varying the division along the lamella structure 110 as described in conjunction with FIGS. 3 and 4 prevents the bulges (caused by the lamella structure itself) that arise during calibration on the surface of the profile to be calibrated from dropping into subsequent grooves of the lamella blocks time and again while advancing the profile to be calibrated through the calibrating basket. The varying position and size of the grooves (and hence of the bulges on the surface of the profile to be calibrated) effectively prevents bulges from being able to fall into sequential grooves.

Figure 5:
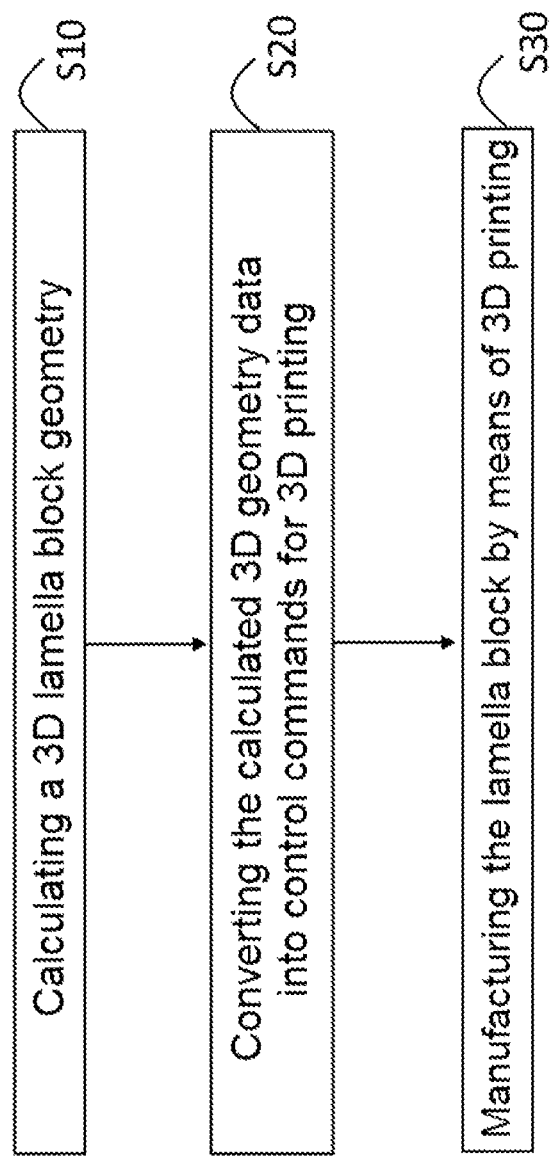
FIG. 5 is a block diagram of a method for manufacturing the lamella block describe don FIGS. 3 and 4.

A generative or additive manufacturing process can be used to manufacture the lamella blocks 100, 100a illustrated on FIGS. 3 and 4. This type of manufacturing process is shown on FIG. 5. In a first step S10, 3D geometry data (CAD data) are here calculated for the lamella block 100, 100a. The 3D geometry data describe the geometry of the entire lamella block 100, 100a comprising the carrier structure 110 and the lamella structure 110, 110a. In a subsequent second step S20, the calculated 3D geometry data are converted into control commands for 3D printing. Based on the generated control commands, the lamella block 100 (in its entirety) is then built up layer by layer by means of a 3D printing process (e.g., laser sintering, laser melting) (step S30). A metal material or a polymer material can be used as the material for 3D printing.

As an alternative to manufacturing via 3D printing as described here, it is also conceivable that the lamella blocks 100, 100a be fabricated out of a workpiece (for example by milling, drilling, cutting) or in a casting process.

Figure 6:
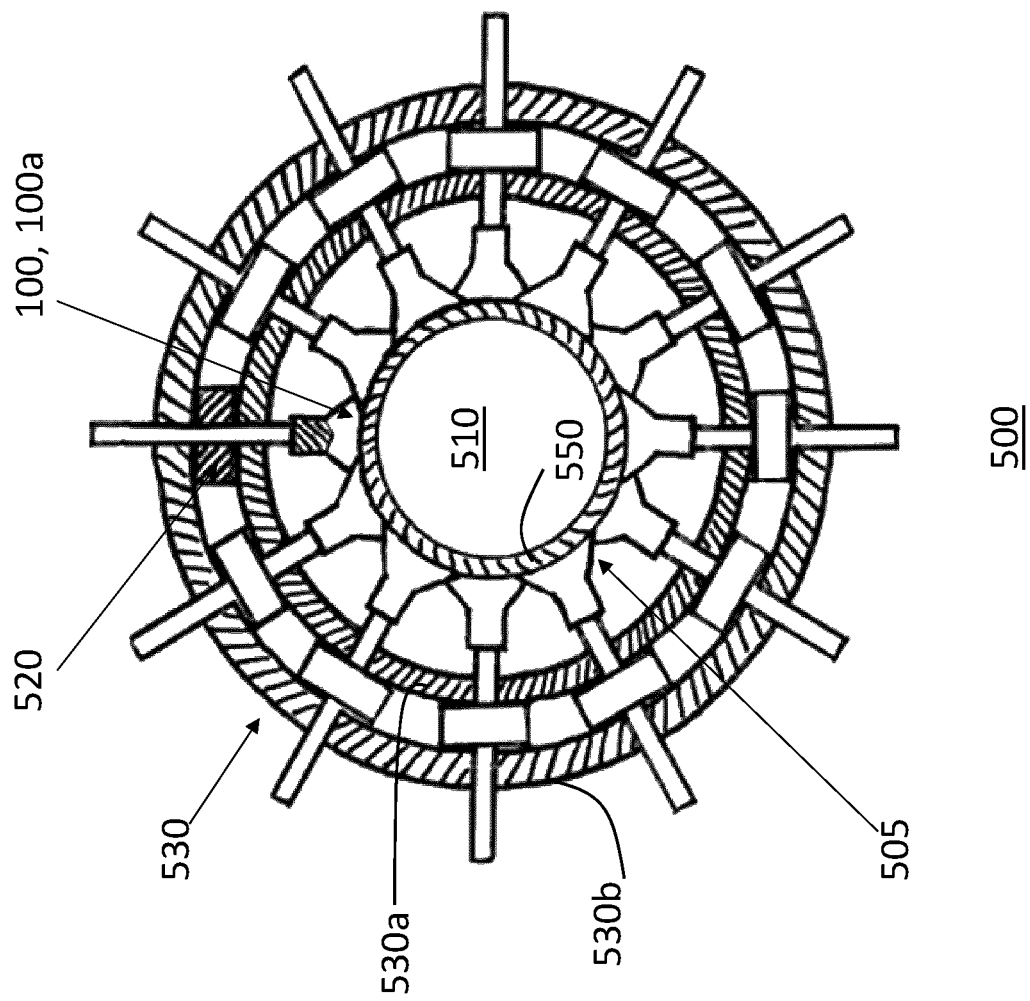
FIG. 6 is a calibrating device according to the present invention.

Described in conjunction with FIG. 6 is a calibrating device 500 for calibrating an extruded plastic profile 550. FIG. 6 shows a sectional view of the calibrating device 500. The profile 550 to be calibrated is a pipe profile in the implementation depicted on FIG. 6.

The calibrating device 500 comprises a plurality of the lamella blocks 100, 100a according to the invention described above, which are arranged in such a way relative to each other in the peripheral direction of the calibrating device 500 as to form a calibration basket 505 with a desired calibrating opening 510. As denoted on FIG. 6, the neighboring lamella blocks 100, 100a can be intermeshing in design. To this end, the lamellae 112 and grooves 114 of neighboring lamella blocks 100, 100a are tailored to each other in terms of their arrangement and dimensions (in particular in terms of the groove width and lamella width) in such a way that the lamellae 112 of neighboring lamella blocks 100, 100a can mesh into each other in a comb-like manner.

The calibrating device 500 further comprises a plurality of activating devices 520 (for example, linear actuators), wherein one respective activating device 520 is coupled with one lamella block 100, 100a. The activating devices 520 are provided to displace the respective lamella blocks 100, 100a in a radial direction (i.e., perpendicular to the feed direction of the profile to be calibrated). This makes it possible to correspondingly adjust the active cross section of the calibrating opening to the profile to be calibrated.

The calibrating device 500 further comprises a housing 530 for receiving the activating devices 520 and the lamella blocks 100, 100a. The housing 530 can be cylindrical in design. It can have an inner housing cylinder 530a and an outer housing cylinder 530b, wherein components of the activating device 520 can be arranged in the gap between the inner housing cylinder 530a and the outer housing cylinder 530b, similarly to the calibrating device described in DE 198 43 340 C2.

The lamella blocks with a continuously varied division described here prevent a periodic bulge pattern from forming on the profile surface of the profile to be extrude. Since the bulge pattern is irregular in design, generated bulges are prevented from falling into subsequent grooves of the lamella blocks while feeding the extruded profile. This prevents the rattling described at the outset during a calibrating process. In addition, the surface structure of the extruded profile is improved, since the changing division of the lamella structure prevents the lamella structure from being repeatedly embossed on the same positions on the profile surface.

What is claimed is:

1. A lamella block for a calibrating device for calibrating an extruded profile, wherein the lamella block comprises a lamella structure including first, second, third, and fourth lamella arranged in succession along a longitudinal direction of the lamella block,
    wherein the first lamella is spaced from the second lamella by a first groove, the second lamella is spaced from the third lamella by a second groove, and the third lamella is spaced from the fourth lamella by a third groove,
    wherein a first distance collectively spans respective widths of the first lamella and the first groove in the longitudinal direction, a second distance collectively spans respective widths of the second lamella and the second groove in the longitudinal direction, and a third distance collectively spans respective widths of the third lamella and the third groove in the longitudinal direction, and
    wherein the first, second, and third distances are all different.

2. The lamella block according to claim 1, wherein the first, second, and third distances vary continuously in the longitudinal direction of the lamella block such that first distance is greater than the second distance, and the second distance is greater than the third distance.

3. The lamella block according to claim 1, wherein the first, second, and third distances vary randomly in the longitudinal direction of the lamella block.

4. The lamella block according to claim 1, wherein the respective widths of the first, second, and third grooves are all different.

5. The lamella block according to claim 1, wherein the respective widths of the first, second, and third lamella are all different.

6. The lamella block according to claim 1, further comprising a carrier structure on which the lamella structure is arranged.

7. The lamella block according to claim 6, wherein the carrier structure and the first, second, third, and fourth lamella are fabricated out of the same material or different materials.

8. The lamella block according to claim 1, wherein the lamella block is integrally designed.

9. The lamella block according to claim 1, wherein the lamella block is manufactured by means of 3D printing or an additive manufacturing process.

* * * * *